United States Patent
Grafton et al.

(10) Patent No.: US 9,390,043 B2
(45) Date of Patent: Jul. 12, 2016

(54) TRIGGER ROUTING UNIT

(71) Applicant: ANALOG DEVICES, INC., Norwood, MA (US)

(72) Inventors: Richard F. Grafton, Abington, MA (US); John M. Young, East Bridgewater, MA (US); David J. Katz, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 837 days.

(21) Appl. No.: 13/716,629

(22) Filed: Dec. 17, 2012

(65) Prior Publication Data

US 2014/0173147 A1   Jun. 19, 2014

(51) Int. Cl.
| | |
|---|---|
| *G06F 9/52* | (2006.01) |
| *G06F 15/78* | (2006.01) |
| *G06F 1/00* | (2006.01) |
| *G06F 13/38* | (2006.01) |
| *G06F 13/22* | (2006.01) |
| *G06F 1/12* | (2006.01) |

(52) U.S. Cl.
CPC ............... *G06F 13/385* (2013.01); *G06F 9/52* (2013.01); *G06F 15/78* (2013.01); *G06F 1/00* (2013.01)

(58) Field of Classification Search
CPC ..... G06F 13/40; G06F 13/364; G06F 21/629; G06F 15/7867; G06F 13/362; G06F 13/28
See application file for complete search history.

(56) References Cited

U.S. PATENT DOCUMENTS

| | | | |
|---|---|---|---|
| 5,771,374 A | 6/1998 | Burshtein et al. | |
| 6,970,961 B1* | 11/2005 | Heitkamp et al. | 710/110 |
| 7,725,636 B2* | 5/2010 | Krig | 710/262 |
| 7,725,638 B2* | 5/2010 | Zhang et al. | 710/301 |
| 7,882,290 B2* | 2/2011 | Lin | 710/110 |
| 8,041,855 B1* | 10/2011 | Ou et al. | 710/35 |
| 8,046,503 B2* | 10/2011 | Couvert et al. | 710/22 |
| 8,415,974 B1* | 4/2013 | Lysaght | 326/39 |
| 8,423,832 B2* | 4/2013 | Riedlinger et al. | 714/37 |
| 8,566,490 B2* | 10/2013 | Weidenkeller | 710/110 |
| 8,713,233 B2* | 4/2014 | Cho et al. | 710/110 |
| 2002/0147554 A1 | 10/2002 | Pickerd | |
| 2005/0034017 A1 | 2/2005 | Airaud et al. | |
| 2005/0198419 A1* | 9/2005 | Noda | 710/110 |
| 2006/0020733 A1* | 1/2006 | Sarda | 710/305 |
| 2008/0278508 A1* | 11/2008 | Anderson et al. | 345/519 |

FOREIGN PATENT DOCUMENTS

WO   2005/052613   6/2005

OTHER PUBLICATIONS

German Language Summons Appendix for German Patent Application Serial No. 102013113262.6 mailed Nov. 20, 2014, 4 pages.
English Summary of German Summons Appendix for German Patent Application Serial No. 102013113262.6 mailed Nov. 20, 2014, 2 pages.

(Continued)

*Primary Examiner* — Henry Tsai
*Assistant Examiner* — Christopher a Daley
(74) *Attorney, Agent, or Firm* — Patent Capital Group

(57) ABSTRACT

Trigger routing in computational hardware such as a digital-signal processor involves routing a trigger signal from a first, master module to a second, slave module, thereby initiating an event at the slave module without involving a core processing unit.

22 Claims, 2 Drawing Sheets

(56) References Cited

OTHER PUBLICATIONS

Response to German Language Summons Appendix for German Patent Application Serial No. 102013113262.6 filed Mar. 6, 2015, 51 pages.
English Summary of Response to German Language Summons Appendix for German Patent Application Serial No. 102013113262.6 filed Mar. 6, 2015, 2 pages.
Tang et al., "A Debug Probe for Concurrently Debugging Multiple Embedded Cores and Inter-Core Transactions in NoC-Based Systems", 978-1-4244-1922-7/08/$25.00 © 2008 IEEE, pp. 416-421.
Tang et al., "In-band Cross-Trigger Event Transmission for Transaction-Based Debug", 978-3-9810801-3-1/DATE08 © 2008 EDAA, 6 pages.
"Synchronizing USB Data Acquisition—From One Device to Multiple Systems", Publish Date: Oct. 1, 2012, www.ni.com, 4 pages.
Abdesselam et al. "The data acquisition and calibration system for the ATLAS Semiconductor Tracker", IOP Science, iopscience.iop.org, Oct. 23, 2007, 25 pages.
Martin et al., "The Tigress DAQ/Trigger System", Manuscript received May 3, 2007. This article is supposed by the National Sciences and Engineering Research Council of Canada, 8 pages.
German Language 6th Auxiliary Request for German Patent Application No. 102013113262.6 filed Mar. 9, 2015, 4 pages.
English Summary of 6th Auxiliary Request for German Patent Application Serial No. 102013113262.6 filed Mar. 9, 2015, 1 page.
German Language Response to Office Action in German Patent Application Serial No. 102013113262.6 filed May 27, 2015, 15 pages.
English Summary of German Language Response to Office Action in German Patent Application Serial No. 102013113262.6 filed May 27, 2015, 15 pages.
English Translation of Amended Claim 1 of German Language Response to Office Action in German Patent Application Serial No. 102013113262.6 filed May 27, 2015, 15 pages.

\* cited by examiner

TRIGGER ROUTING UNIT

TECHNICAL FIELD

Embodiments of the present invention generally relate to digital-signal processors and, in particular, to event sequence control in digital-signal processors.

BACKGROUND

A typical computer processing system (such as a general-purpose CPU, digital-signal processor ("DSP") MCU, MPU, FPGA, ASIC, ASSP, or any other type of computer processor) includes a core processor ("core") and a plurality of special-purpose modules in communication therewith. The core executes DSP-related and other processing functions, and the modules may be random-access or other memories, direct-memory-access ("DMA") devices, co-processors, input/output handlers, timers, or any other similar circuitry. To activate a module to perform an operation (referred to herein as an "event"), the core processor receives a request to initiate the event and sends an initiation message (referred to herein as a "trigger") to the module via, for example, use of a software interrupt. The core may thus exchange data, address, and/or control signals with one or more of the modules to, for example, send data to or load data from a memory module.

Often, however, one module may send data (or other information) directly to another module without the need for the information to pass through a processor or "core." For example, a DMA-capable device (which facilitates direct access to memory without the involvement of the core) may interact directly with a memory module or other DMA-capable device. The core, however, is still needed to schedule and trigger initiation of the event, thus creating overhead (e.g., interrupt handling and service routine overhead) in the core and reducing the performance thereof. At most, a DMA controller may relieve the core of triggering certain DMA events by "chaining" the events (i.e., completion of a first DMA event triggers a second one). This DMA chaining is, however, limited to only certain kinds of DMA events and, moreover, cannot be used for other module types (e.g., non-DMA modules). A need therefore exists for a robust, programmable system and method for relieving the core processor of a wide variety of triggering responsibility.

SUMMARY

In general, various aspects of the systems and methods described herein include a trigger-routing unit that coordinates the triggering of events without the need for involvement from a core processor. The trigger-routing unit may be programmed to associate a first module that creates a trigger signal (i.e., a "trigger master") with a second module that receives the trigger signal and initiates an event associated therewith (i.e., a "trigger slave"). In various embodiments, multiple modules may create triggers for a single recipient module, a single module may create a trigger for multiple recipient modules, or any combination thereof.

As used herein, the terms "trigger" and "signal" broadly connote assertion of any type of signal, command or status indicator that results in a state change in one or more system components. Furthermore, "sending" or "asserting" a trigger (or "triggering" an event) includes not only direct transmission of a signal from one entity to another but more broadly includes any action that achieves a desired state change in the target entity—for example, setting a status bit that is interrogated by the target entity. The term "module" generally connotes a hardware element (i.e., circuitry) unless otherwise noted, and may involve a single discrete element or multiple elements cooperating to perform a noted function.

In one aspect, a system for controlling a sequence of events includes a plurality of programmable registers, each associated with one of a plurality of slave modules. Selection circuitry associates, based on the contents of one of the registers, one of the slave modules with one of the master modules. An input port receives, from the master module associated with the slave module, a trigger signal indicating completion of a first event at the master module. An output port sends, to the slave module associated with the master module, the trigger signal to thereby trigger a second event at the slave module.

A programming input may receive a memory-mapped register ("MMR") signal for programming the plurality of registers. A trigger-master register may initiate a trigger signal upon receipt of a programming signal. An OR gate may accept a trigger signal from the trigger-master register or from one of the plurality of master modules. The selection circuitry may associate more than one of the plurality of slave modules with one of the plurality of master modules. The master module may be the same as the slave module; the first event and second event may be both performed at the master module. A status register may indicate a status of the system, and an error register may indicate information about an error that occurred in the system. A global-control register may set a global status of the system. The master module may be a first direct-memory access ("DMA")-capable device or the slave module may a second DMA-capable device.

In another aspect, a method for controlling a sequence of events includes (i) enabling a trigger-routing unit to accept programming commands, (ii) programming a register in the trigger-routing unit to thereby associate an incoming trigger signal from a master module with an outgoing trigger signal to a slave module, (iii) configuring the master module to send the incoming trigger signal to the trigger-routing unit upon completion of a first event, and (iv) configuring the slave module to accept the outgoing trigger signal from the trigger-routing unit and to initiate a second event upon receipt of the outgoing trigger signal.

The second event may be triggered by programming a register in the trigger-routing unit. Error information associated with an error in programming the register and or status information associated with the trigger-routing unit may be stored. The register may be programmed to associate the incoming trigger signal with one or more additional slave modules. The outgoing trigger signal may initiate events at the one or more additional slave modules.

In another aspect, a processor includes a core processing unit and a plurality of modules (including a master module and a slave module). A trigger-routing unit includes a register associated with the slave module, selection circuitry for associating, based on the contents of the register, the slave module with the master module, an input port for receiving, from the master module associated with the slave module, a trigger signal indicating completion of a first event at the master module; and an output port for sending, to the slave module associated with the master module, the trigger signal to thereby trigger a second event at the slave module. The second event is triggered without involvement from the core processing unit.

The trigger-routing unit may further include a programming input for receiving a memory-mapped register ("MMR") signal for programming the register and/or a trigger-master register for initiating a trigger signal upon receipt of a programming signal. The master module and the slave module may be DMA-capable devices.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
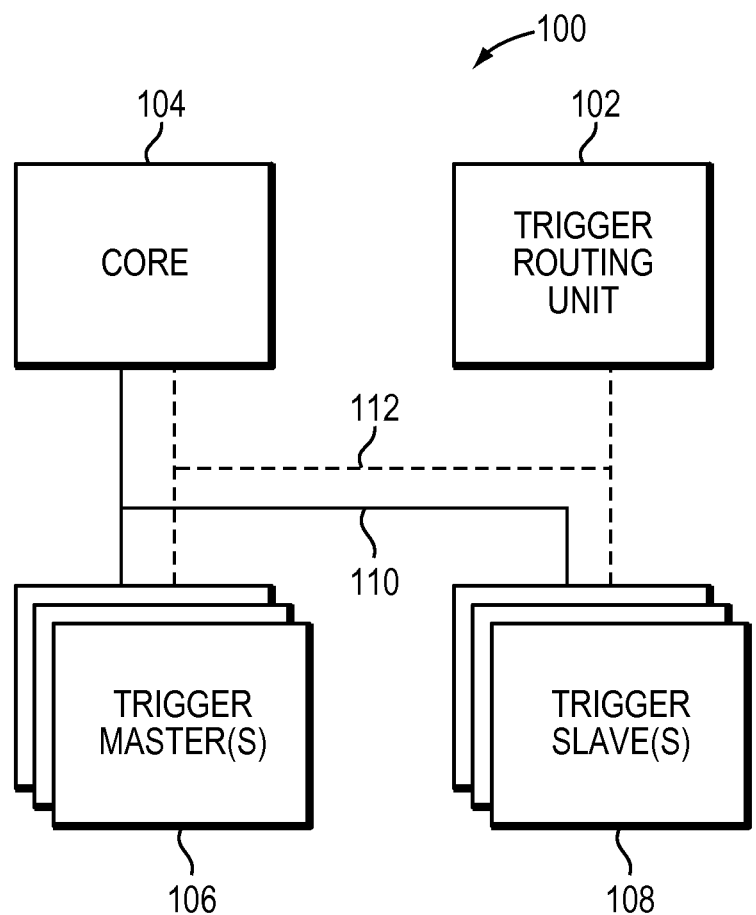
FIG. 1 is a block diagram illustrating a processing system that includes a trigger-routing unit in accordance with an embodiment of the invention.

FIG. 1 illustrates an exemplary system 100 that includes a trigger-routing unit 102, a processor core 104, one or more trigger masters 106, and one or more trigger slaves 108. The core 102 may be any microprocessor, digital-signal processor, or any other type of instruction-executing circuitry, and may include one or more sub-cores. The current invention is not limited, however, to any particular type or configuration for the core 104. The trigger master 106 and trigger slave 108 may be any kind of system module, including but not limited to random-access or other memories, direct-memory-access ("DMA") devices and/or channels, pin-interrupt blocks, pulse-width modulation synchronization blocks, UARTs, USB interfaces, co-processors, input/output handlers, timers, or any other circuitry.

The core 104, trigger masters 106, and trigger slaves 108 may communicate over a data and/or address bus 110, which may include a computer bus (e.g., an industry-standard architecture or "ISA" bus), a system-on-a-chip bus (e.g., an advanced-extensible interface or "AXI" bus), or any other type of communicative connection as known in the art. The bus 110 may further include control circuitry, such as a DMA controller. The trigger-routing unit 102, core 104, trigger masters 106, and trigger slaves 108 may further send and receive control signals over a control bus 112, which may be separate from, part of, or the same as the data bus 110. The system 100 may further include other cores 104, modules, memories, timers, or any other types of circuitry; the current invention is not limited to any particular set of circuit elements.

In various embodiments, a trigger master 106 asserts a trigger signal in response to the beginning or completion of an event (or the beginning or completion of a sub-event within a larger event). This trigger signal is communicated to the trigger-routing unit 102 (via the data 110 or control 112 bus), where it is received and sent to a trigger slave 108. In response to the receipt of the trigger signal, the trigger slave initiates an action (e.g., an event or other task) without interaction with, or participation by, the core 104 (for example, the action may be initiated without assertion of an interrupt from or by the core 104). The trigger signal may include a rising edge, falling edge, level-based signal, or a pulse; the trigger-routing unit 102 and the trigger slaves 108 may register the signal as asserted when they observe a rising edge, falling edge, or a different level of the trigger signal.

The illustrated embodiment 100 depicts a trigger master 106 and a trigger slave 108; in other embodiments, modules may serve as both trigger masters and trigger slaves (e.g., as a master for a first event or at a first point in time and as a slave for a second event or at a second point in time). A trigger master may serve as its own slave (i.e., the master generates a trigger signal that is sent to the trigger-routing unit 102 and then back to the original master, which then behaves as a trigger slave for that event). In this embodiment, the trigger master/slave may perform the same event (or group of events) repeatedly because it continually generates its own trigger signal; the event may be repeated until the system is acted upon by an outside source (when, e.g., the trigger-routing unit 102 is reprogrammed).

The trigger-routing unit 102 may be configured to assign a relationship between a particular trigger master 106 and a particular trigger slave 108 such that assertion of a trigger signal by the particular trigger master triggers an event at the particular slave. In other embodiments, the trigger-routing unit 102 may be configured such that more than one trigger master 106 may trigger an event at a trigger slave 108 and/or configured such that a trigger master 106 may trigger an event at more than one slave 108. The present invention, in any of the embodiments described herein, is not limited to any number of triggering masters 106 or receiving slaves 108, and one of skill in the art will understand that embodiments of the present invention may be applied to any different combinations thereof. A trigger master 106 may thus be used to synchronize the occurrence of an event at two or more trigger slaves 108 by configuring the trigger-routing unit 102 to apply the trigger signal generated by the trigger master 106 to the two or more trigger slaves 108. In another embodiment, multiple trigger-master signals may be simultaneously or contemporaneously generated and applied to two or more trigger slaves 108 in order to synchronize occurrence of events at the slaves 108.

In one embodiment, one or more registers (or other storage devices) in the trigger-routing unit 102 is programmed to establish the relationship between the one or more trigger masters 106 and the one or more trigger slaves 108. The registers may be programmed using any method known in the art, such as via software instructions, via debug-mode or control-mode instructions, via a memory-mapped register ("MMR") protocol, via access to a control protocol (such as, e.g., a JTAG port), or by any other means.

Figure 2:
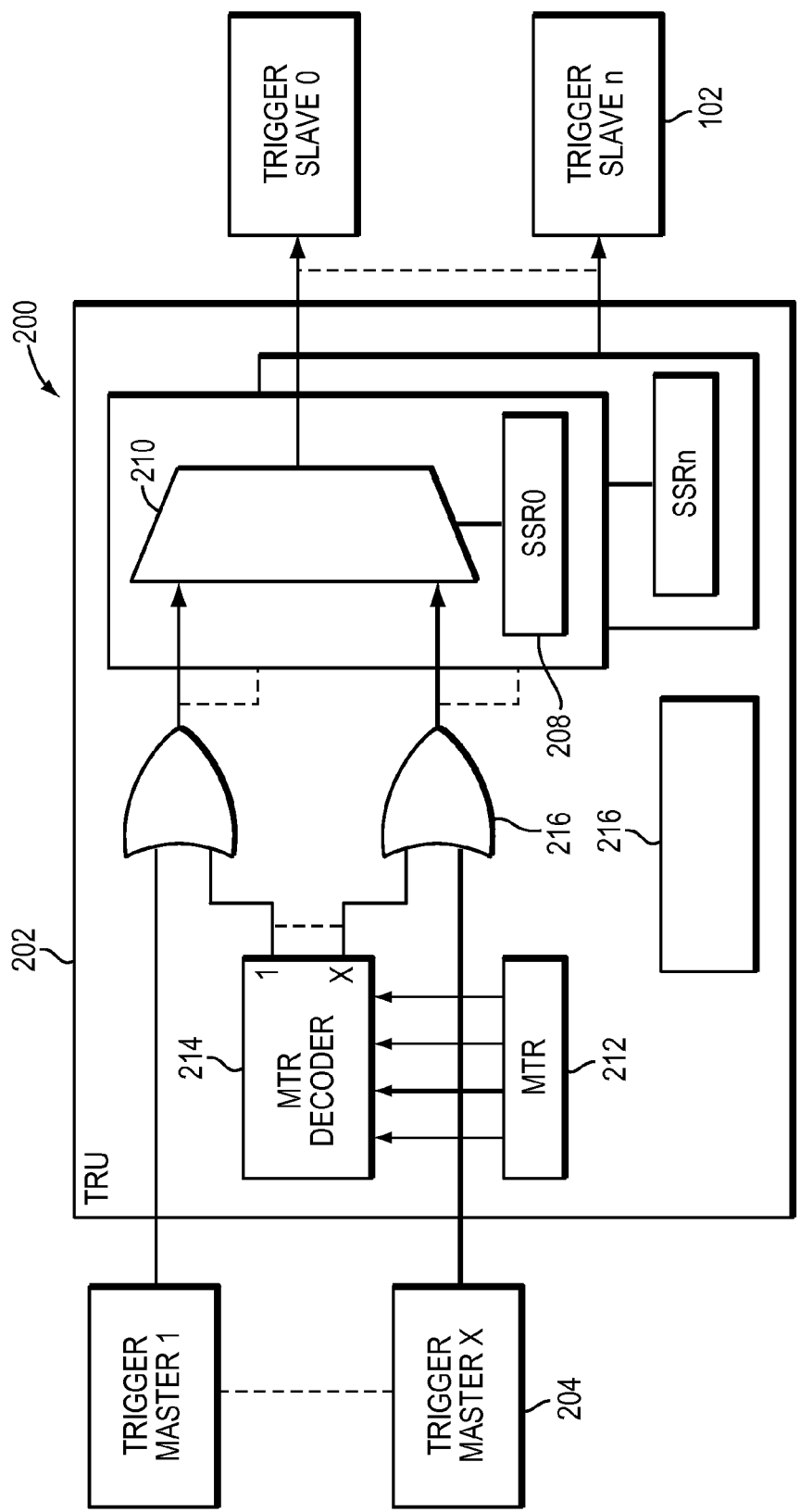
FIG. 2 is a block diagram of an exemplary implementation of a trigger-routing unit in accordance with an embodiment of the invention.

FIG. 2 illustrates a system 200 that includes one embodiment of a trigger-routing unit 202, a plurality of trigger masters 204, and a plurality of trigger slaves 206. Each slave is assigned a slave-select register 208 that may be programmed with a code, number, or address corresponding to one or more of the trigger signals arriving at the trigger-routing unit 202 from the trigger masters 204; there may therefore be a separate slave-select register 208, or separate portion of a register, for each trigger slave. The slave-select register 208 may further contain a lock bit that, when set, prevents the currently stored address from being overwritten. In the illustrated embodiment, the slave-select register 208 is used to control a select line for a multiplexer 210, which connects one of the incoming trigger signals to a particular trigger slave 206. One of skill in the art will understand, however, that any method of selecting one or more of the incoming trigger signals and assigning them to one or more of the trigger slaves 206 using information in the slave-select register 208 is within the scope of the current invention. In one embodiment, each slave-select register 208 is 32 bits in size; bits 7:0 are used to select one of a plurality of trigger-signal sources, and bit 31 is used to lock the register.

In one embodiment, a trigger signal may be asserted via a software instruction (instead of being asserted by a trigger master 204). In this embodiment, a master-trigger register 212 is programmed in a manner similar to the slave-select registers 208 (or in any other manner). A decoder 214 decodes the contents of the master-trigger register 212 and generates one or more software-initiated (via, e.g., the programming of a MTR via software) trigger signals. These trigger signals may be combined with the signals generated by the trigger masters 204 by the use of, for example, an OR gate 216 (or other comparable logic function) such that an event at a given trigger slave 206 may be triggered by a trigger master 204 and/or by the programming of the master-trigger register 212. In one embodiment, the master-trigger register 212 is 32 bits in size and divided into four separate eight-bit registers. An eight-bit address may be written to any one of the four eight-bit registers in order to create a trigger signal (the triggering of which may include, for example, a transition from a low state to a high state).

The trigger-routing unit 202 may include additional read and/or write registers 216 that provide additional functionality. An error register may be configured to hold information related to an error, such as the address corresponding to an invalid attempt to write to a slave-select register 208; the attempt may be invalid because the error-generating address is outside a valid range or because it specifies a locked slave-select register 208. In one embodiment, the error register is a 32-bit register, and bits 11:0 are used to hold an error address. The error address may correspond to the first such error encountered (i.e., subsequent errors do not overwrite the first-encountered error) or the last error encountered (e.g., subsequent errors overwrite the first-encountered error). In one embodiment, more than one error may be stored in the error register; the present invention is not limited to storing any particular number of errors, or to doing so in any particular order.

The additional registers 216 may further include one or more status registers for indicating a status of the trigger-routing unit and/or other registers therein. For example, one or more bits of the status register may indicate whether an invalid address has been provided to the slave-select register 208 and/or the master-trigger register 212. An additional bit or bits may be used to indicate whether a lock-write error has occurred (i.e., an attempt was made to lock the slave-select register 208, master-trigger register 212, or other register against writing, and the attempt failed). These status bits may be read to determine their status and written to reset their status. The status register may be 32 bits in size.

The additional registers 216 may also include one or more global-control registers for providing control and functions that affect the entire trigger-routing unit 202. For example, the global-control register may be used to lock one or more of the other registers in the trigger-routing unit 202, to reset the trigger-routing unit 202, and/or to enable the trigger-routing unit 202. One or more bits in the global-control register may further be used to lock one or more of the other bits in the global-control register.

A revision-identification register may also be included in the additional registers 216. This register may be read-only, and may contain one or more bits programmed to a serial number, version identification number (which may include a first field for a major version number and a second field for an incremental version number), or any other identification or classification information.

One of skill in the art will understand that there are many ways to program the trigger-routing unit 202, and that the current invention is not limited to any particular method. In one embodiment, the programming is performed in such a way as to prevent a trigger master from generating a trigger signal before a trigger slave is configured to receive it. For example, the global-control register may first be written to enable the trigger-routing unit 202, and a slave-select register 208 may then be written to assign a trigger slave to a trigger master. The trigger slave may then be enabled to wait for and accept an incoming trigger signal and, finally, a trigger master may be enabled to generate a trigger.

The trigger-routing unit may contain additional features. For example, an event counter may track how often one or more triggers occur. Incoming trigger signals may be filtered, and some not sent to a given slave, with the use of, for example, an event-skip counter that forwards only every Nth trigger to a slave). An event interval counter may be used to report the time that has elapsed or expired since a last trigger event. An event watchdog may indicate when an event is absent for a certain amount of time (e.g., number of cycles) by, e.g., triggering an interrupt. In one embodiment, a first trigger event from a first master asserts an outgoing trigger signal (e.g., defines an asserting edge of an outgoing waveform) and a second trigger event from a second master de-asserts an outgoing trigger signal (e.g., defines a de-asserting edge of an outgoing waveform). The trigger-routing unit may contain memory to log or store trigger requests from one or more masters if, for example, there is a high rate of trigger requests and/or a slave is busy. These log or stored requests may remain pending until they can be acted upon (e.g., the slave is no longer busy). In one embodiment, a trigger may be routed to an output pin to an off-chip slave. In various embodiments, any and all of these features may be implemented in the trigger-routing unit or in a peripheral to a trigger slave.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A trigger-routing system for controlling a sequence of events, the system comprising:
    a plurality of programmable registers, each register associated with one of a plurality of slave modules;
    selection circuitry for associating, based on the contents of one of the plurality of registers, one of a plurality of master modules to one of the plurality of slave modules;
    an input port of the trigger-routing system for receiving, from the master module associated with the slave module, a trigger signal indicating completion of a first event at the master module; and an output port of the trigger-routing system for sending, to the slave module associated with the master module, the trigger signal to thereby trigger a second event at the slave module, wherein the second event is triggered without involvement from a core processing unit to trigger the second event and wherein the core processing unit is communicatively connected to the plurality of slave modules and the plurality of master modules over a data and/or address bus.

2. The system of claim 1, further comprising a programming input for receiving a memory-mapped register ("MMR") signal for programming the plurality of registers.

3. The system of claim 1, further comprising a trigger-master register for initiating a trigger signal upon receipt of a programming signal.

4. The system of claim 3, further comprising an OR gate for accepting a trigger signal from the trigger-master register or from one of the plurality of master modules.

5. The system of claim 1, wherein the selection circuitry associates more than one of the plurality of slave modules with one of the plurality of master modules or more than one of the plurality of master modules with one of the plurality of slave modules.

6. The system of claim 1, wherein the master module is the same as the slave module, and wherein the first event and second event are both performed at the master module.

7. The system of claim 1, further including a status register for indicating a status of the system.

8. The system of claim 1, further including an error register for indicating information about an error that occurred in the system.

9. The system of claim 1, further including a global-control register for setting a global status of the system.

10. The system of claim 1, wherein the master module is a first direct-memory access ("DMA")-capable device or the slave module is a second DMA-capable device.

11. A method for controlling a sequence of events, the method comprising:
enabling a trigger-routing unit to accept programming commands;
assigning a register in the trigger-routing unit to a slave module;
programming the register assigned to the slave module to associate an incoming trigger signal from a master module with an outgoing trigger signal to the slave module;
configuring the master module to send the incoming trigger signal to the trigger-routing unit upon completion of a first event; and
configuring the slave module to accept the outgoing trigger signal from the trigger-routing unit and to initiate a second event upon receipt of the outgoing trigger signal, wherein the second event is initiated without involvement from a core processing unit to initiate the second event and wherein the core processing unit is communicatively connected to the slave module and the master module over a data and/or address bus.

12. The method of claim 11, further comprising triggering the second event by programming a register in the trigger-routing unit.

13. The method of claim 11, further comprising storing error information associated with an error in programming the register.

14. The method of claim 11, further comprising storing status information associated with the trigger-routing unit.

15. The method of claim 11, further comprising programming the register to associate the incoming trigger signal with one or more additional slave modules.

16. The method of claim 15, wherein the outgoing trigger signal initiates events at the one or more additional slave modules.

17. A processor comprising:
a core processing unit;
a plurality of modules comprising a master module and a slave module; and
a trigger-routing unit comprising:
  i. a register associated with the slave module;
  ii. selection circuitry for associating, based on the contents of the register associated with the slave module, the slave module with the master module;
  iii. an input port for receiving, from the master module associated with the slave module, a trigger signal indicating completion of a first event at the master module; and
  iv. an output port for sending, to the slave module associated with the master module, the trigger signal to thereby trigger a second event at the slave module,
wherein the second event is triggered without involvement from the core processing unit to trigger the second event and wherein the core processing unit is communicatively connected to the master module and the slave module over a data and/or address bus.

18. The processor of claim 17, wherein the trigger-routing unit further comprises a programming input for receiving a memory-mapped register ("MMR") signal for programming the register.

19. The processor of claim 17, wherein the trigger-routing unit further comprises a trigger-master register for initiating a trigger signal upon receipt of a programming signal.

20. The processor of claim 17, wherein the master module and the slave module are DMA-capable devices.

21. A system for controlling a sequence of events, the system comprising:
means for enabling a trigger-routing unit to accept programming commands;
means for assigning a register in the trigger-routing unit to a slave module;
means for programming the register assigned to the slave module to associate an incoming trigger signal from a master module with an outgoing trigger signal to the slave module;
means for configuring the master module to send the incoming trigger signal to the trigger-routing unit upon completion of a first event; and
means for configuring the slave module to accept the outgoing trigger signal from the trigger-routing unit and to initiate a second event upon receipt of the outgoing trigger signal,
wherein the second event is initiated without involvement from a core processing unit to initiate the second event and wherein the core processing unit is communicatively connected to the slave module and the master module over a data and/or address bus.

22. The system of claim 21, further comprising means for triggering the second event by programming a register in the trigger-routing unit.

* * * * *